US011915084B2

(12) United States Patent
Murayama et al.

(10) Patent No.: US 11,915,084 B2
(45) Date of Patent: Feb. 27, 2024

(54) ANTENNA DEVICE AND RFID TAG COMMUNICATION DEVICE

(71) Applicant: Murata Manufacturing Co., Ltd., Nagaokakyo (JP)

(72) Inventors: Hiromi Murayama, Nagaokakyo (JP); Noboru Kato, Nagaokakyo (JP); Noriyuki Ueki, Nagaokakyo (JP); Yoichi Saito, Nagaokakyo (JP); Makoto Yasutake, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 160 days.

(21) Appl. No.: 17/660,073

(22) Filed: Apr. 21, 2022

(65) Prior Publication Data

US 2022/0245421 A1    Aug. 4, 2022

Related U.S. Application Data

(63) Continuation of application No. PCT/JP2020/046520, filed on Dec. 14, 2020.

(30) Foreign Application Priority Data

Apr. 27, 2020  (JP) .................. 2020-078454

(51) Int. Cl.
*G06K 19/077* (2006.01)
*H01Q 7/00* (2006.01)

(52) U.S. Cl.
CPC ......... *G06K 19/07773* (2013.01); *H01Q 7/00* (2013.01)

(58) Field of Classification Search
CPC ....... G06K 19/07773; G06K 19/07777; G06K 19/07784; H01Q 7/00; H01Q 1/2216; H01Q 3/24; H04B 5/0087
See application file for complete search history.

(56) References Cited

U.S. PATENT DOCUMENTS 9,293,825 B2 * 3/2016 Rivera .................. H01Q 7/005
10,205,237 B2 * 2/2019 Tsukuda .................. H01Q 3/24
(Continued)

FOREIGN PATENT DOCUMENTS

JP    H09181520 A    7/1997
JP    H11282990 A    10/1999
(Continued)

OTHER PUBLICATIONS

International Search Report issued for PCT/JP2020/046520, dated Mar. 16, 2021.
(Continued)

*Primary Examiner* — Seung H Lee
(74) *Attorney, Agent, or Firm* — ArentFox Schiff LLP (57) ABSTRACT

An antenna device is provided as a near-field communication antenna device that is configured by arranging a plurality of loop antennas. Each loop antenna includes a plurality of parallel circuits each having a capacitor and a resistance element; and a plurality of looped conductors in a shape of a loop that is divided. The divided looped conductors are connected to each other via the parallel circuits, and the plurality of looped conductors and the plurality of parallel circuits form a loop.

20 Claims, 9 Drawing Sheets

(56) References Cited

U.S. PATENT DOCUMENTS

| | | | | |
|---|---|---|---|---|
| 10,756,434 B1 * | 8/2020 | Borchardt | ................ | H01Q 1/52 |
| 11,639,977 B2 * | 5/2023 | Rehner | .............. | G01R 33/3628 |
| | | | | 324/322 |
| 2005/0001779 A1 | 1/2005 | Copeland et al. | | |
| 2012/0206239 A1 | 8/2012 | Ikemoto | | |
| 2017/0046544 A1 | 2/2017 | Ikemoto | | |
| 2018/0276429 A1 | 9/2018 | Ikemoto | | |

FOREIGN PATENT DOCUMENTS

| | | | |
|---|---|---|---|
| JP | 2005027296 A | 1/2005 |
| JP | 2007174470 A | 7/2007 |
| JP | 2009232397 A | 10/2009 |
| JP | 2017058917 A | 3/2017 |
| WO | 2011118379 A1 | 9/2011 |

OTHER PUBLICATIONS

Written Opinion of the International Searching Authority issued for PCT/JP2020/046520, dated Mar. 16, 2021.

* cited by examiner

ANTENNA DEVICE AND RFID TAG COMMUNICATION DEVICE

CROSS REFERENCE TO RELATED APPLICATIONS

The present application is a continuation of PCT/JP2020/046520 filed Dec. 14, 2020, which claims priority to Japanese Patent Application No. 2020-078454, filed Apr. 27, 2020, the entire contents of each of which are incorporated herein by reference.

TECHNICAL FIELD

The present invention relates to an antenna device used for a communication device that performs wireless communication in a near field, and an RFID tag communication device including the antenna device.

BACKGROUND

WO 2011/118379 A (hereinafter "Patent Literature 1") discloses a reader/writer antenna that is magnetically coupled to an RFID tag.

Antennas used in an RFID system include an electric field antenna and a magnetic field antenna. In the electric field antenna, a communication distance can be increased, but for example, in the case of an electric field antenna such as a dipole antenna, an antenna pattern having a wavelength of ½ of a communication frequency is planarly formed. On the other hand, the magnetic field antenna can be basically configured only by forming a coiled antenna, and thus can be more easily downsized than the electric field antenna.

A reader/writer magnetic field antenna can expand its communication range with RFID tags on the plane by increasing the loop size. However, if the loop size is too large, the magnetic field intensity at each point on the loop antenna weakens, and communication with a small RFID tag cannot be performed. Therefore, it is difficult to expand the communication range.

In order to expand the communication range on the plane, a method of arranging a plurality of loop antennas on a plane has also been proposed. However, even in such a configuration, adjacent loop antennas are likely to interfere with each other, and this interference causes a problem that desired characteristics cannot be obtained. In addition, the characteristics of the plurality of loop antennas greatly differ depending on positions within the arrangement range. For example, when a large number of loop antennas are arranged on a plane, a loop antenna disposed inward of an arrangement region is surrounded by many other loop antennas, whereas a loop antenna on a peripheral edge portion of the arrangement region has only a few adjacent loop antennas. Therefore, the loop antenna disposed inward is greatly affected by surrounding loop antennas, but the loop antenna on the peripheral edge portion is less affected by adjacent loop antennas. That is, the characteristics of the loop antennas are greatly different for each location.

SUMMARY OF THE INVENTION

Therefore, it is an object of the present invention to provide an antenna device that suppresses interference with another adjacent loop antenna and eliminates non-uniformity of characteristics of each loop antenna within an arrangement range of a plurality of loop antennas. Moreover, an RFID tag communication device including the antenna device is also provided.

Accordingly, in an exemplary aspect, an antenna device is provided as a near-field communication antenna device that is configured by arranging a plurality of loop antennas. In this aspect, each of the loop antennas includes a plurality of parallel circuits each having a capacitor and a resistance element; and a plurality of looped conductors in a shape of a loop that is divided. The divided looped conductors are connected to each other via the parallel circuits, and the plurality of looped conductors and the plurality of parallel circuits form a loop.

Moreover, an RFID tag communication device is provided according to an exemplary aspect that includes the antenna device described above; and an RFID tag communication circuit. In this aspect, a distributor is connected between the plurality of loop antennas of the antenna device and the RFID tag communication circuit.

Yet further, an RFID tag communication device is provided according to an exemplary aspect that includes the antenna device described above; and an RFID tag communication circuit. In this aspect, a changeover switch is connected between the plurality of loop antennas of the antenna device and the RFID tag communication circuit.

With the above noted configuration, in each loop antenna, a plurality of resonance circuits are configured by a plurality of looped conductors and capacitors, and resonance is damped by resistance elements connected respectively in parallel to the capacitors. Therefore, interference between adjacent loop antennas is suppressed by this configuration. That is, each loop antenna can be arranged without considering the influence on the surrounding loop antennas, and an arrangement range of the loop antennas can be easily expanded.

According to the exemplary aspects of the present invention, an antenna device is provided that suppresses interference with another adjacent loop antenna and eliminates non-uniformity of characteristics of each loop antenna within an arrangement range of a plurality of loop antennas. Moreover, an RFID tag communication device is provided in an exemplary aspect that includes the antenna device.

DETAILED DESCRIPTION OF EMBODIMENTS

Figure 1:
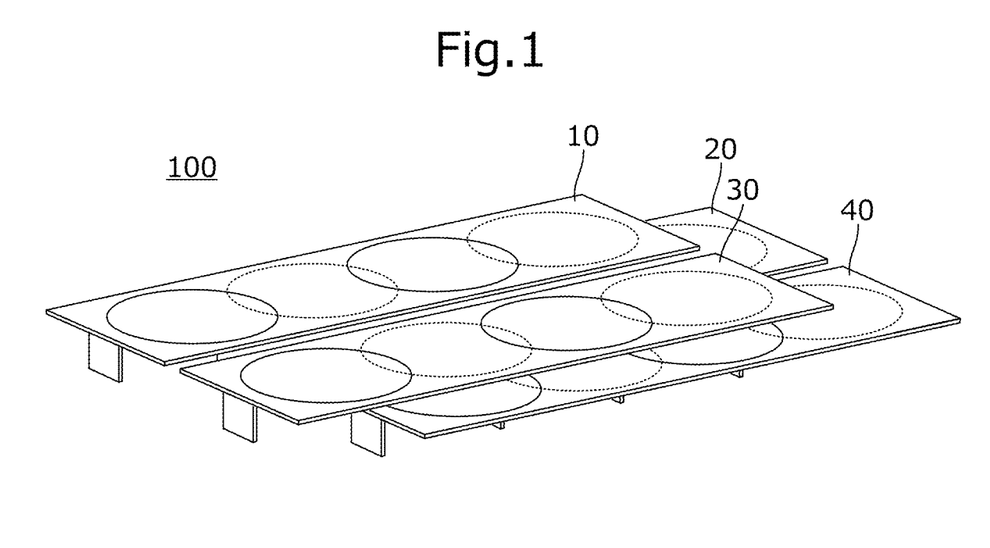
FIG. 1 is a schematic perspective view of an antenna device 100 according to an exemplary embodiment of the present invention.
Figure 2:
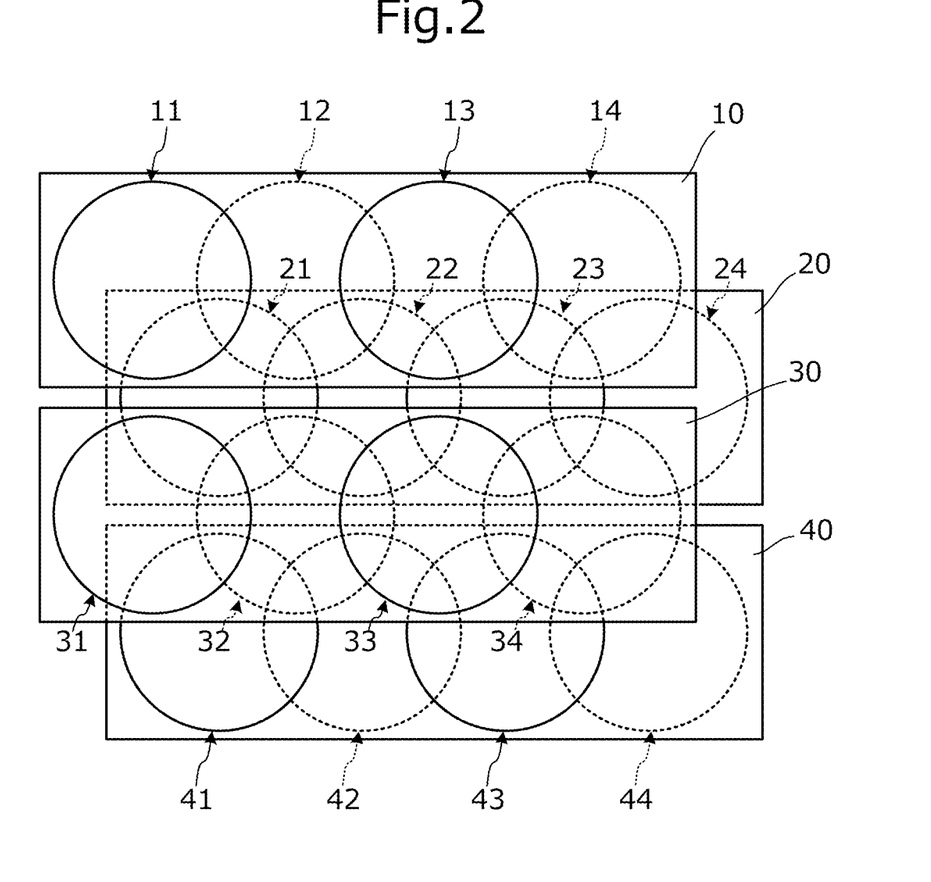
FIG. 2 is a plan view of a main part of the antenna device 100.

FIG. 1 is a schematic perspective view of an antenna device 100 according to an exemplary embodiment of the present invention. FIG. 2 is a plan view of a main part of the antenna device 100. The antenna device 100 is a near-field communication antenna device configured by arranging a plurality of loop antennas. For example, the antenna device 100 is used as an antenna device of an RFID tag communication device in an exemplary aspect. That is, an RFID tag communication device is configured by connecting the antenna device 100 to an RFID tag communication circuit (not shown).

As shown, the antenna device 100 includes substrates 10, 20, 30, and 40. In this aspect, four loop antennas are provided on each of the substrates 10, 20, 30, and 40. As illustrated in FIG. 2, loop antennas 11, 12, 13, and 14 are provided on the substrate 10, loop antennas 21, 22, 23, and 24 are provided on the substrate 20, loop antennas 31, 32, 33, and 34 are provided on the substrate 30, and loop antennas 41, 42, 43, and 44 are provided on the substrate 40. The loop antennas 11, 12, 13, 14, 21, 22, 23, 24, 31, 32, 33, 34, 41, 42, 43, and 44 have the same configuration. Moreover, the substrates 10, 20, 30, and 40 are either flexible substrates or rigid substrates in exemplary aspects.

In the plurality of loop antennas 11, 12, 13, 14, 21, 22, 23, 24, 31, 32, 33, 34, 41, 42, 43, and 44, loop surfaces of the plurality of loop antennas are arranged in parallel to each other, and the loops of the plurality of loop antennas overlap each other in a plan view with respect to the loop surfaces.

Figure 3A:
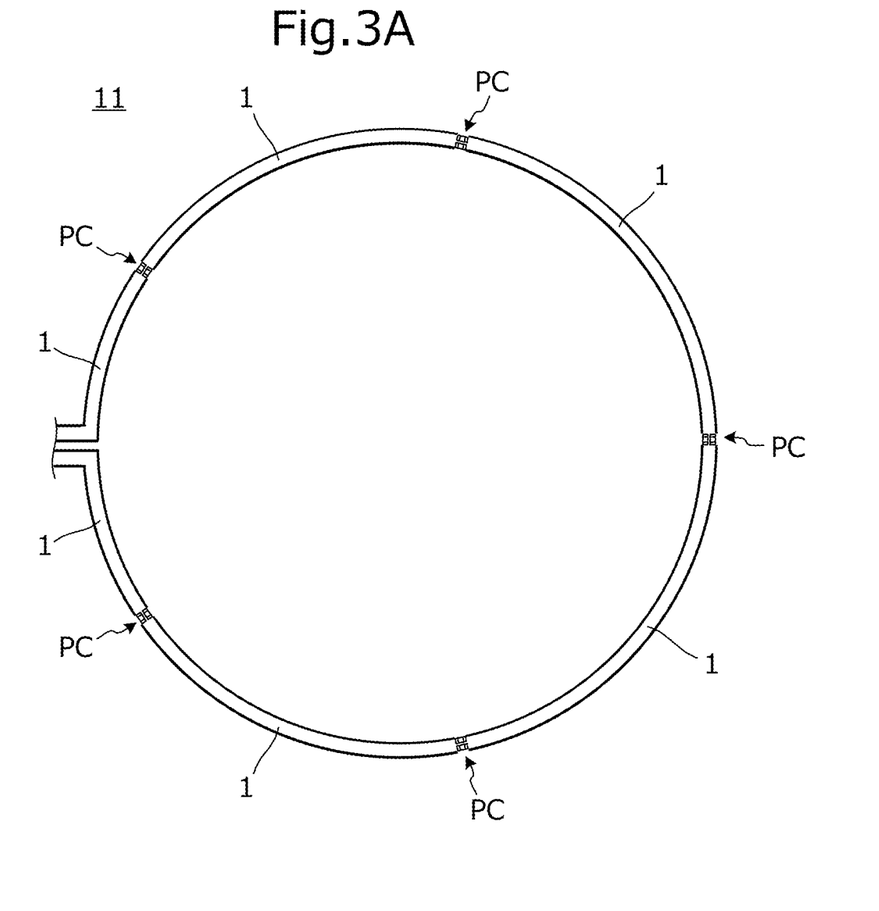
FIGS. 3A and 3B are diagrams illustrating a configuration of a loop antenna.
Figure 3B:
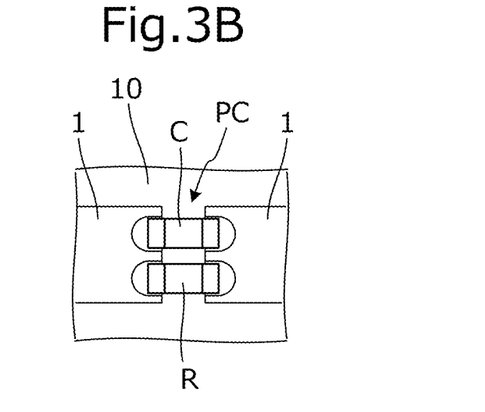

FIGS. 3A and 3B are diagrams illustrating the configuration of the loop antennas. Although the loop antennas are schematically illustrated in FIGS. 1 and 2, FIG. 3A is a plan view illustrating a detailed configuration of the loop antenna 11 which is an exemplar of one of the loop antennas. FIG. 3B is a plan view of a parallel circuit PC provided in a part of the loop antenna.

As shown, the loop antenna 11 includes a plurality of parallel circuits PC in which a capacitor C and a resistance element R are connected in parallel, and a plurality of looped conductors 1 in a shape of a loop that is divided. The looped conductors 1 are a conductor pattern provided on the substrate 10 by printing a patterned copper foil or conductor. Moreover, the capacitor C is a chip capacitor, and the resistance element R is a chip resistor in exemplary aspects.

As illustrated in FIG. 3B, a first looped conductor 1 and a second looped conductor 1 are connected via a parallel circuit PC, and the loop antenna 11 is configured by the plurality of looped conductors 1 and the plurality of parallel circuits PC.

In an exemplary aspect, the loop antenna 11 has a diameter of, for example, about 50 mm to 100 mm, and an RFID tag to be communicated has a size of about 1.2 mm on one side. A surface of the antenna device 100 illustrated in FIG. 1 and the RFID tag are communicated within a range of about 5 mm from a contact position. Moreover, there can be a single RFID tag or a plurality of RFID tags distributed.

The RFID tag uses, for example, a 900 MHz band. The antenna device 100 is an antenna device that is configured to communicate with the RFID tag in the near field.

Figure 4A:
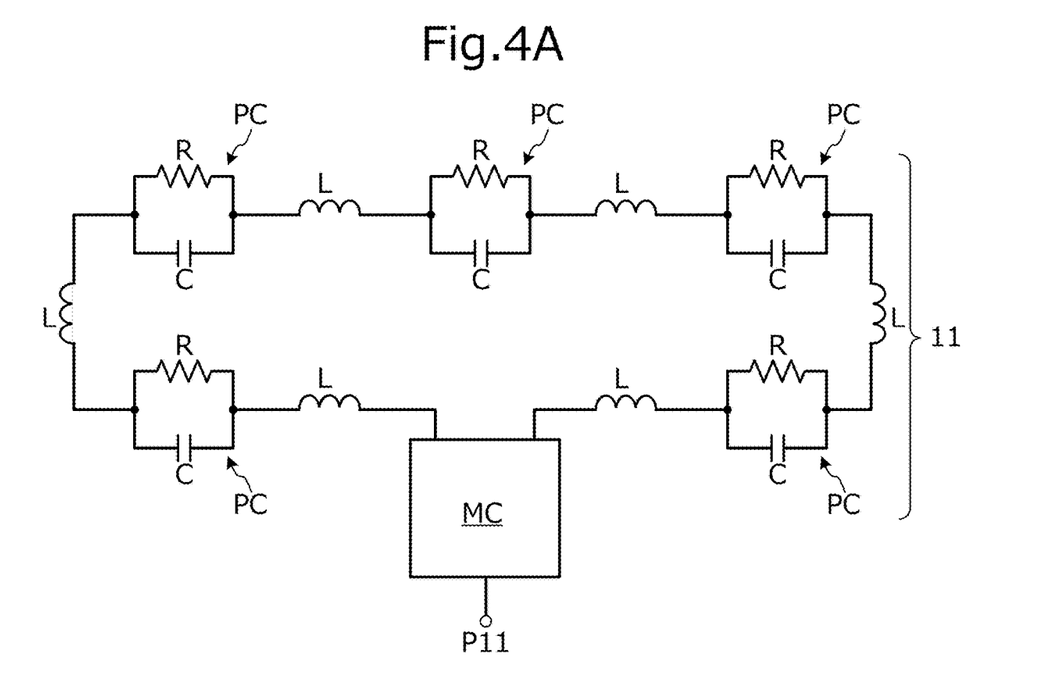
FIG. 4A is an equivalent circuit diagram of a loop antenna 11.
Figure 4B:
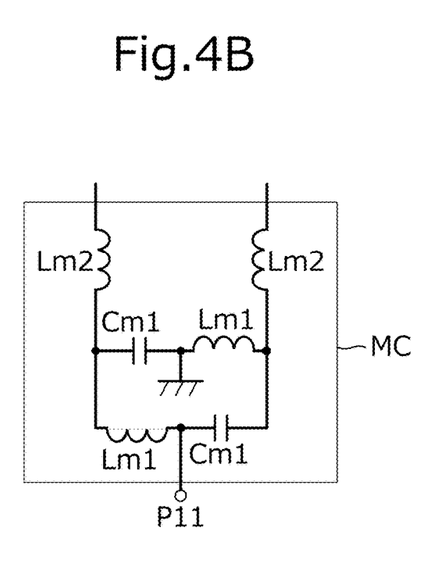
FIGS. 4B and 4C are circuit diagrams of a matching circuit MC connected to the loop antenna 11.
Figure 4C:
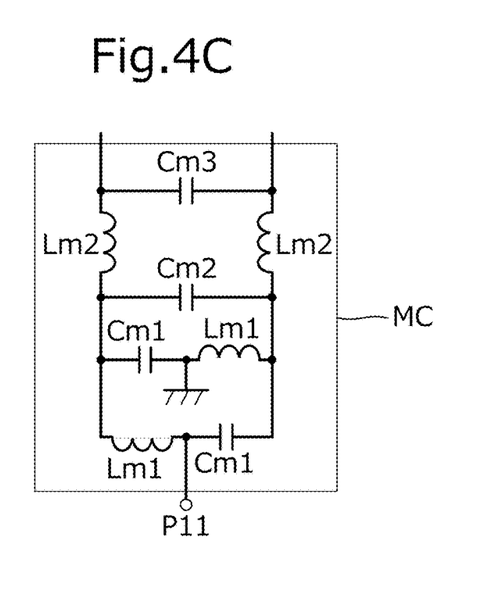

FIG. 4A is an equivalent circuit diagram of the loop antenna 11 (as an example). FIGS. 4B and 4C are circuit diagrams of a matching circuit MC connected to the loop antenna 11. In FIG. 4A, an inductor L is a lumped parameter element corresponding to an inductance component of the looped conductor 1 of the loop antenna 11. As described above, the loop antenna 11 can be expressed as a circuit in which the inductor L corresponding to the looped conductor 1 is connected via the parallel circuit PC including the capacitor C and the resistance element R.

In the loop antenna 11, a plurality of resonance circuits are configured by inductances of the plurality of looped conductors 1 and capacitances of the plurality of capacitors C, and resonances of the resonance circuits are damped by the resistance elements R connected in parallel to the capacitors C.

The matching circuit MC performs impedance matching to, for example, 50Ω which is an input/output impedance of the RFID tag communication circuit described later. The loop antenna 11 is a balanced circuit, and the matching circuit MC performs balance-unbalance conversion and impedance matching. An input/output terminal P11 of the matching circuit MC is an unbalanced input/output terminal.

The matching circuit MC illustrated in FIG. 4B includes an inductor Lm1 connected between one of balanced lines and the ground, a capacitor Cm1 connected between the other line and the ground, a capacitor Cm1 connected between the one of the balanced lines and the input/output terminal P11, and an inductor Lm1 connected between the other line and the input/output terminal P11. An inductor Lm2 is connected to each of the two lines in series.

In the matching circuit MC illustrated in FIG. 4C, a capacitor Cm3 is connected between lines at a preceding stage (e.g., loop antenna 11 side) of the inductors Lm2 and Lm2, and a capacitor Cm2 is connected between lines at a subsequent stage (e.g., RFID tag communication circuit side) of the inductors Lm2 and Lm2. Other configurations are similar to those of the matching circuit MC illustrated in FIG. 4B.

Such a matching circuit MC is configured to match the input/output impedance of the RFID tag communication circuit, and to also perform balance-unbalance conversion. The configuration of the matching circuit MC illustrated in FIGS. 4B and 4C is an example, and there can be many variations according to alternative aspects.

Figure 5:
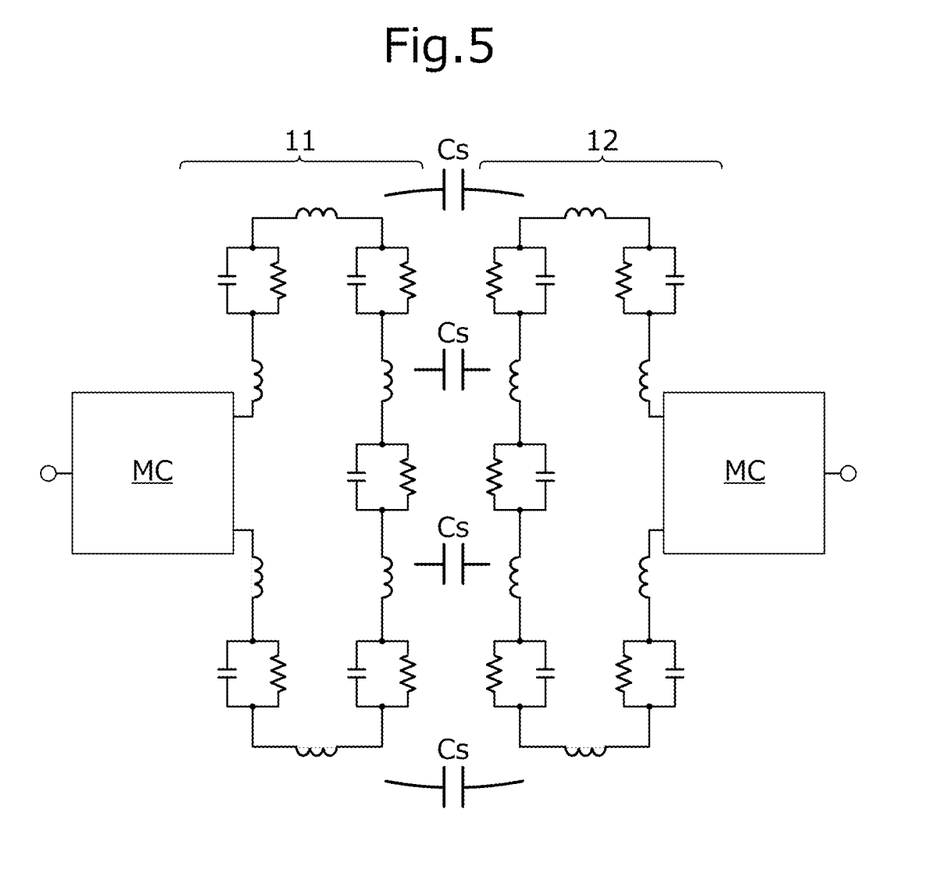
FIG. 5 is an equivalent circuit diagram of the loop antenna 11 and a loop antenna 12 illustrated in FIG. 2.

FIG. 5 is an equivalent circuit diagram of the loop antenna 11 and the loop antenna 12 illustrated in FIG. 2. The loop antenna 11 and the loop antenna 12 are parasitic coupled mainly via a stray capacitance Cs between the looped conductors 1. In addition, the loop antenna 11 and the loop antenna 12 are coupled by parasitic mutual inductance mainly generated between the looped conductors 1. However, according to the present embodiment, since the resonances of the resonance circuits of the loop antennas are damped by the resistance elements R, interference between the loop antennas adjacent to each other in the plane direction or the stacking direction is suppressed. That is, each loop antenna maintains independent characteristics.

Figure 6:
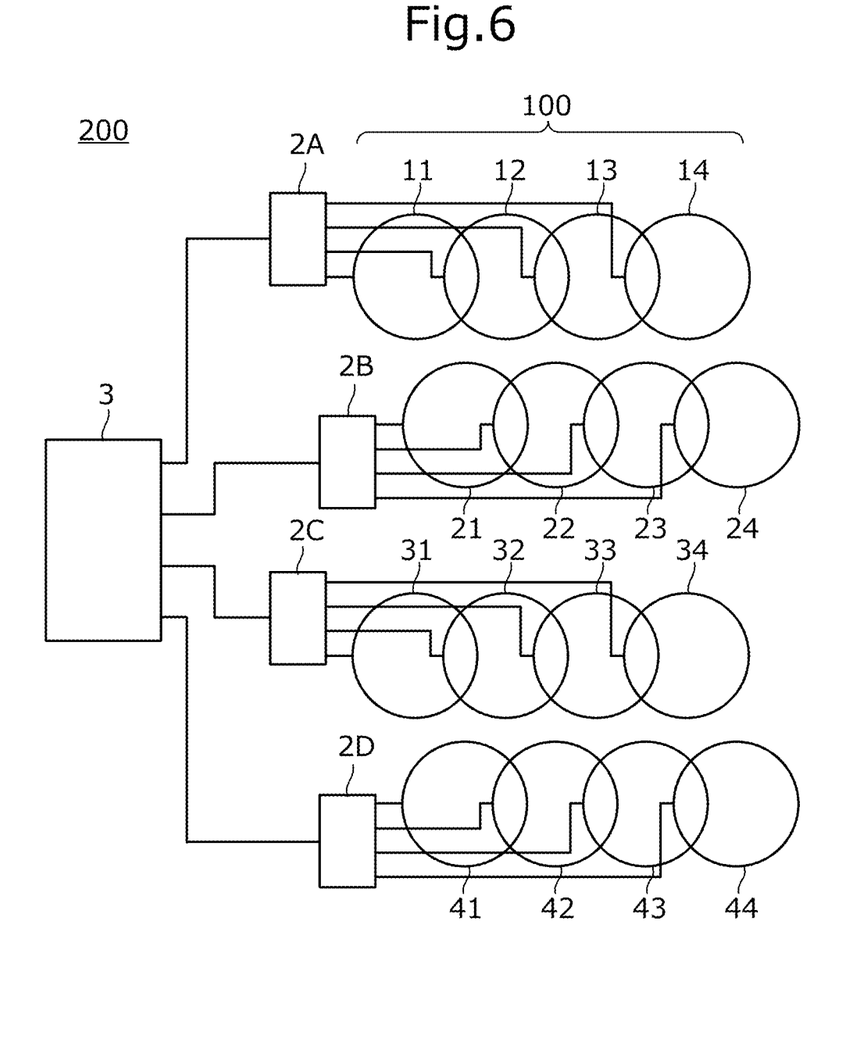
FIG. 6 is a diagram illustrating a configuration of an RFID tag communication device 200.

FIG. 6 is a diagram illustrating a configuration of an RFID tag communication device 200. The RFID tag communication device 200 includes the antenna device 100, an RFID tag communication circuit 3, and distributors 2A, 2B, 2C, and 2D. it is noted that in FIG. 6, the parallel circuit PC illustrated in FIGS. 3A and 3B and the matching circuit MC illustrated in FIG. 4 are not illustrated.

In FIG. 6, the RFID tag communication circuit 3 is an RFID tag reader, an RFID tag reader/writer, or the like. In the example illustrated in FIG. 6, each of the distributors 2A, 2B, 2C, and 2D is a distributor with one input and four outputs or a distributor with four inputs and one output.

In the example illustrated in FIG. 6, the distributors 2A, 2B, 2C, and 2D are provided, but changeover switches can be provided in these portions instead of the distributors in an alternative aspect.

The RFID tag communication circuit 3 includes four input/output ports, and distribution circuits or changeover switches similar to the distributor 2A, 2B, 2C, or 2D are provided for the four input/output ports.

With the above configuration, the RFID tag communication circuit 3 uses the antenna device 100 as a single antenna. Alternatively, any one of the loop antennas 11, 12, 13, 14, 21, 22, 23, 24, 31, 32, 33, 34, 41, 42, 43, and 44 can be sequentially selected and used by switching of the switches.

Figure 7A:
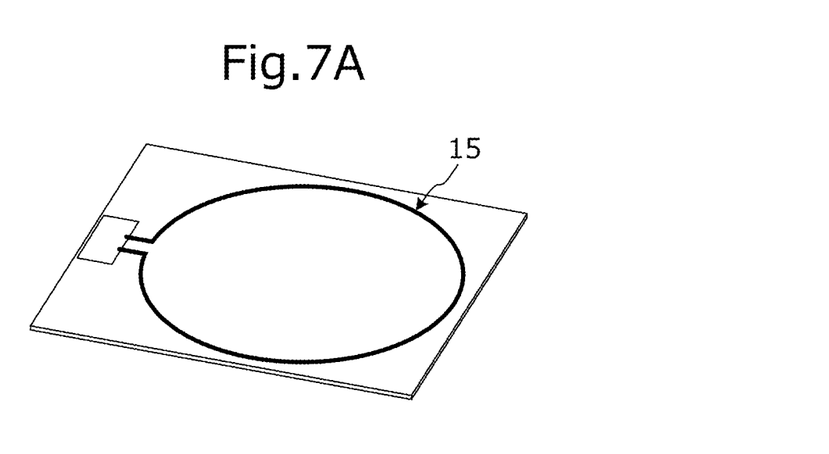
FIG. 7A is a schematic perspective view of a single loop antenna 15.
Figure 7B:
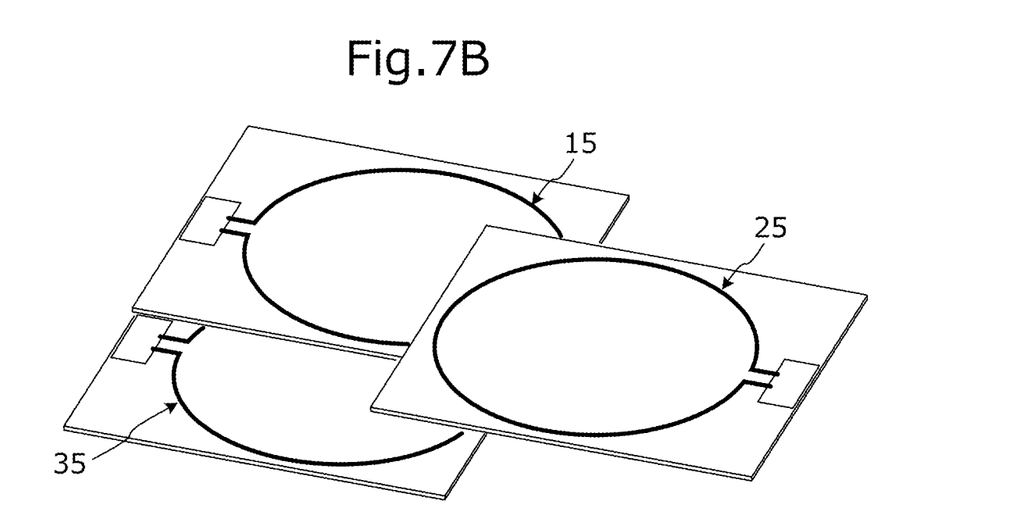
FIG. 7B is a schematic perspective view of the antenna device according to the present embodiment.

Next, characteristics of the antenna device of the present embodiment will be described. FIG. 7A is a schematic perspective view of a single loop antenna 15. FIG. 7B is a schematic perspective view of the antenna device according to the present embodiment. In the examples illustrated in FIGS. 1 and 2, the antenna device 100 including 16 loop antennas is illustrated, but in FIG. 7B, for characteristic comparison, the antenna device is configured by three loop antennas 15, 25, and 35. The configurations of these loop antennas 15, 25, and 35 are as illustrated in FIGS. 3A, 3B, and 4.

Figure 8A:
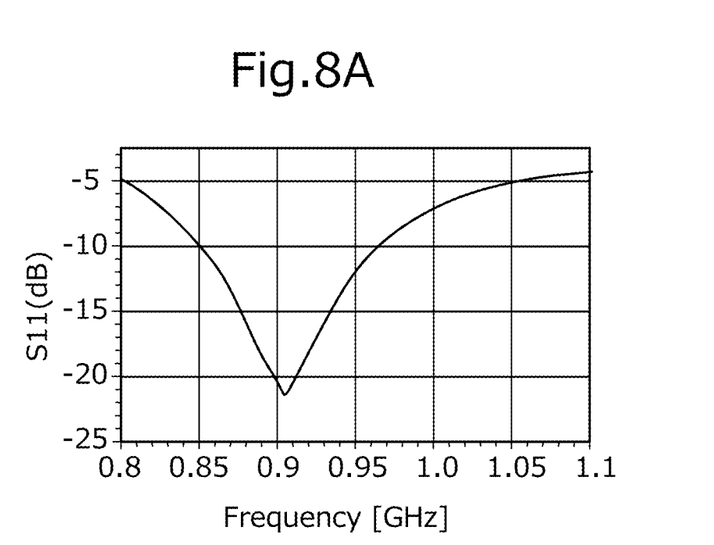
FIGS. 8A and 8B are diagrams illustrating frequency characteristics of S parameters of the loop antenna illustrated in FIGS. 7A and 7B.
Figure 8B:
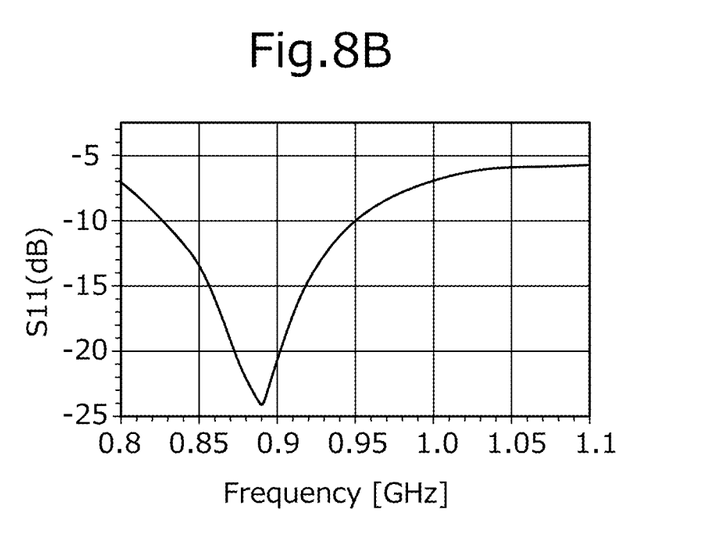
Figure 9A:
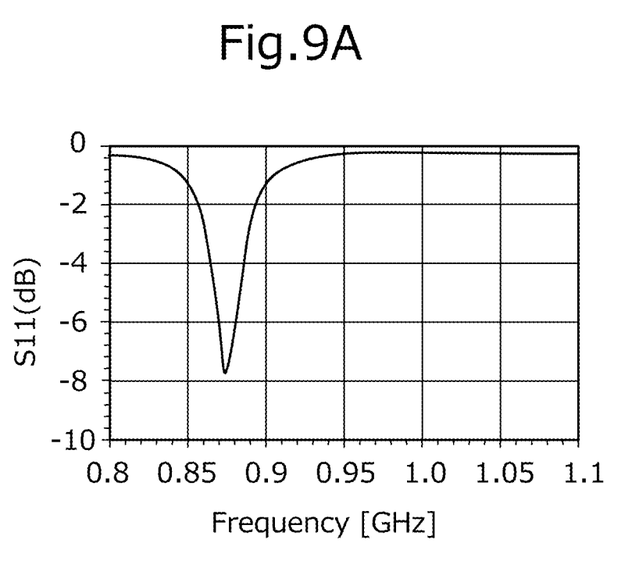
FIGS. 9A and 9B are diagrams illustrating frequency characteristics of S parameters of a loop antenna of a comparative example.
Figure 9B:
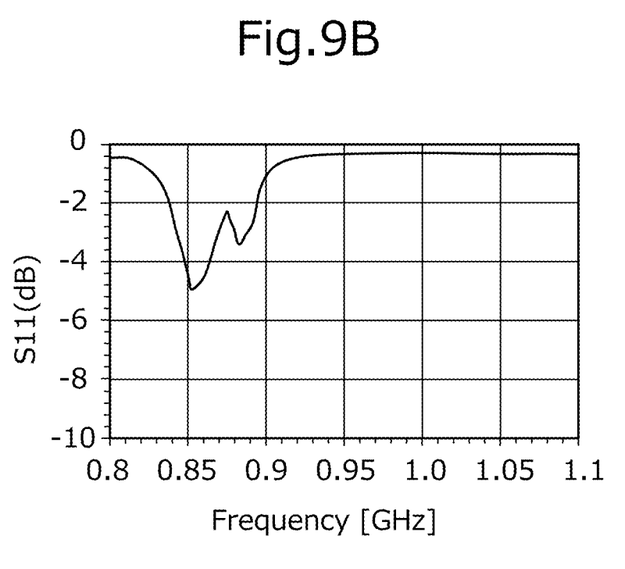

FIGS. 8A and 8B are diagrams illustrating frequency characteristics of S parameters of the loop antenna illustrated in FIGS. 7A and 7B. Further, FIGS. 9A and 9B are diagrams illustrating frequency characteristics of S parameters of a loop antenna of a comparative example. The loop antenna of this comparative example is a simple loop antenna that does not include the parallel circuit PC illustrated in FIGS. 3A, 3B, and 4, but the appearance is as illustrated in FIGS. 7A and 7B.

First, characteristics of an antenna device of the comparative example will be described. Characteristics of the single loop antenna resonate at 0.875 GHz and a reflection coefficient S11 at this frequency is −8 dB as illustrated in FIG. 9A, whereas characteristics of the antenna device including three loop antennas resonate at 0.855 GHz and the reflection coefficient S11 at this frequency is −5 dB as illustrated in FIG. 9B. In addition, resonance occurs at 0.88 GHz, and the reflection coefficient S11 at that frequency is −3 dB. In this manner, as the three loop antennas 15, 25, and 35 interfere with each other, the reflection coefficient S11 near the resonance frequency becomes shallow.

On the other hand, the characteristics of the single loop antenna (e.g., the loop antenna 15 of FIG. 7A) included in the antenna device of the present embodiment resonate at 0.905 GHz and the reflection coefficient S11 at this frequency is −21 dB as illustrated in FIG. 8A. The characteristics of the antenna device of the present embodiment including the three loop antennas (e.g., the loop antennas 15, 25, and 35 illustrated in FIG. 7B) resonate at 0.89 GHz and the reflection coefficient S11 at this frequency is −24 dB as illustrated in FIG. 8B.

As described above, in the antenna device of the present embodiment, in each loop antenna, the plurality of resonance circuits are configured by the plurality of looped conductors 1 and the capacitors C, and resonance is damped by the resistance elements R connected in parallel to the capacitors C. Therefore, interference between adjacent loop antennas is suppressed in this configuration. As a result, as illustrated in FIGS. 9A and 9B, a decrease in the reflection coefficient S11 due to interference between the loop antennas is avoided.

Finally, it is generally noted that the present invention is not limited to the above-described embodiment. Modifications and alterations can be appropriately made by those skilled in the art.

For example, in the examples illustrated in FIGS. 1 and 2, the example in which four sets of four loop antennas (11, 12, 13, 14) (21, 22, 23, 24) (31, 32, 33, 34) (41, 42, 43, 44) arranged in a line are provided has been described. However, it should be appreciated that this is just an example of an exemplary configuration, and the number of loop antennas in one set and the number of sets are arbitrary.

Furthermore, in the examples illustrated in FIGS. 1 and 2, the example in which a plurality of sets of loop antennas arranged in a row are arranged in a direction of 60 degrees or 120 degrees with respect to the column direction is shown, but the present invention is not limited thereto, and the loop antennas may be arranged in a direction (e.g., a row direction) of 90 degrees with respect to the column direction, for example.

Furthermore, in the examples illustrated in FIGS. 1 and 2, the loop antennas 11 and 44 overlap two adjacent loop antennas, respectively, and the loop antennas 22, 23, 32, and 33 overlap six adjacent loop antennas, respectively. However, the number of overlapping is an example, and variations of the number of overlapping adjacent loop antennas can be implemented in alternative aspects.

Furthermore, in the examples illustrated in FIGS. 1 and 2, the loop antennas arranged in a line are provided on the substrates 10, 20, 30, and 40, respectively, but a plurality of rows of loop antennas can be provided on a single substrate. In addition, the loop antennas can be formed on only one surface of the substrate instead of both surfaces.

In the example illustrated in FIG. 3A, five parallel circuits PC are provided for one loop antenna, but the number of parallel circuits PC may be set according to the size of the loop antennas or the overlapping manner with the adjacent loop antennas. Usually, it is preferable to provide more parallel circuits PC as the circumferential length of the loop antenna increases.

In the examples illustrated in FIGS. 3A and 3B, the chip capacitor and the chip resistor form the parallel circuit PC, but a capacitor may be formed, instead of the chip capacitor, by making conductor layers face each other with a dielectric layer interposed therebetween. In addition, the resistance element may be configured by a pattern of a resistor.

REFERENCE SIGNS LIST

C, Cm1, Cm2, Cm3 Capacitor
Cs Stray capacitance
L, Lm1, Lm2 Inductor
MC Matching circuit
P11 Input/output terminal
PC Parallel circuit
R Resistance element
Looped conductor
2A, 2B, 2C, 2D Distributor
RFID tag communication circuit
10, 20, 30, 40 Substrate
11, 12, 13, 14, 21, 22, 23, 24, 31, 32, 33, 34, 41, 42, 43, 44 Loop antenna
100 Antenna device
200 RFID tag communication device

The invention claimed is:

1. An antenna device comprising:
a plurality of loop antennas with each of the loop antennas including:

a plurality of parallel circuits each having a capacitor and a resistance element; and a plurality of looped conductors in a shape of a divided loop, wherein the plurality of looped conductors are connected to each other via the plurality of parallel circuits, respectively, such that the plurality of looped conductors and the plurality of parallel circuits collectively form a loop.

2. The antenna device according to claim 1, wherein loop surfaces of the plurality of loop antennas are arranged in parallel to each other.

3. The antenna device according to claim 2, wherein the respective loops of each of the plurality of loop antennas overlap each other in a plan view with respect to the loop surfaces.

4. The antenna device according to claim 1, further comprising a plurality of matching circuits, wherein each of the plurality of matching circuits is connected to the plurality of loop antennas.

5. The antenna device according to claim 1, further comprising a substrate including a top surface and a bottom surface that are disposed side by side in a vertical direction, with the plurality of loop antennas disposed on either the top surface or the bottom surface of the substrate.

6. The antenna device according to claim 5, wherein the plurality of loop antennas are disposed in one line, when viewed in the vertical direction.

7. The antenna device according to claim 1, further comprising a substrate including a top surface and a bottom surface that are disposed side by side in a vertical direction, with each of the plurality of loop antennas disposed on either the top surface or the bottom surface of the substrate.

8. The antenna device according to claim 7, wherein at least one of the plurality of loop antennas is disposed on the top surface of the substrate, and at least one of the plurality of loop antennas is disposed on the bottom surface of the substrate.

9. The antenna device according to claim 1, further comprising a plurality of substrates with respective sets of the plurality of loop antennas disposed on a top surface or bottom surface of each substrate of the plurality of substrates.

10. The antenna device according to claim 9, wherein each of the respective sets of the plurality of loop antennas on each substrate comprises multiple loop antennas that overlap each other in a plan view of the respective substrate.

11. The antenna device according to claim 10, wherein the respective sets of the plurality of loop antennas are arranged in respective rows and in a direction of 60 degrees or 120 degrees with respect to a column direction of the plurality of substrates.

12. An RFID tag communication device comprising:
the antenna device according to claim 1;
an RFID tag communication circuit; and
a distributor connected between the plurality of loop antennas of the antenna device and the RFID tag communication circuit.

13. The RFID tag communication device according to claim 12, wherein loop surfaces of the plurality of loop antennas are arranged in parallel to each other, and the respective loops of each of the plurality of loop antennas overlap each other in a plan view with respect to the loop surfaces.

14. The RFID tag communication device according to claim 12, wherein the antenna device further comprises a plurality of matching circuits that are each connected to the plurality of loop antennas.

15. The RFID tag communication device according to claim 12, wherein the antenna device further comprises a substrate including a top surface and a bottom surface that are disposed side by side in a vertical direction, with the plurality of loop antennas disposed on either the top surface or the bottom surface of the substrate.

16. An RFID tag communication device comprising:
the antenna device according to claim 1;
an RFID tag communication circuit; and
a changeover switch connected between the plurality of loop antennas of the antenna device and the RFID tag communication circuit.

17. The RFID tag communication device according to claim 16, wherein loop surfaces of the plurality of loop antennas are arranged in parallel to each other, and the respective loops of each of the plurality of loop antennas overlap each other in a plan view with respect to the loop surfaces.

18. The RFID tag communication device according to claim 16, wherein the antenna device further comprises a plurality of matching circuits that are each connected to the plurality of loop antennas.

19. The RFID tag communication device according to claim 16, wherein the antenna device further comprises a substrate including a top surface and a bottom surface that are disposed side by side in a vertical direction, with the plurality of loop antennas disposed on either the top surface or the bottom surface of the substrate.

20. The RFID tag communication device according to claim 16, wherein the changeover switch is configured to sequentially select each of the plurality of loop antennas of the antenna device.

* * * * *